US008654913B2

(12) United States Patent
Huckett et al.

(10) Patent No.: US 8,654,913 B2
(45) Date of Patent: Feb. 18, 2014

(54) EQUALISATION PROCESSING

(75) Inventors: Simon Huckett, Bristol (GB); Phil Jones, Swindon (GB); Carlo Luschi, Oxford (GB)

(73) Assignee: ICERA, Inc., Wilmington, DE (US)

(*) Notice: Subject to any disclaimer, the term of this patent is extended or adjusted under 35 U.S.C. 154(b) by 511 days.

(21) Appl. No.: 12/935,849

(22) PCT Filed: Mar. 26, 2009

(86) PCT No.: PCT/EP2009/053603
§ 371 (c)(1),
(2), (4) Date: Nov. 22, 2010

(87) PCT Pub. No.: WO2009/121795
PCT Pub. Date: Oct. 8, 2009

(65) Prior Publication Data
US 2011/0058597 A1    Mar. 10, 2011

(30) Foreign Application Priority Data
Apr. 3, 2008  (GB) .................................. 0806064.2

(51) Int. Cl.
*H04B 1/10*  (2006.01)

(52) U.S. Cl.
USPC ............ 375/350; 375/229; 375/232; 375/346

(58) Field of Classification Search
USPC .................. 375/229–236, 346–350
See application file for complete search history.

(56) References Cited

U.S. PATENT DOCUMENTS

| 5,809,086 | A | 9/1998 | Ariyavisitakul |
| 6,674,822 | B1 | 1/2004 | Legrand et al. |
| 7,193,983 | B2* | 3/2007 | Liang et al. .................... 370/335 |
| 2003/0078025 | A1* | 4/2003 | Smee et al. ..................... 455/307 |
| 2003/0081668 | A1* | 5/2003 | Yousef et al. .................. 375/232 |
| 2003/0095617 | A1 | 5/2003 | Lee et al. |
| 2004/0161029 | A1* | 8/2004 | Malladi et al. ................. 375/232 |

(Continued)

FOREIGN PATENT DOCUMENTS

| CN | 101079863 A | 11/2007 |
| EP | 0496467 A2 | 1/1992 |

(Continued)

OTHER PUBLICATIONS

Japanese Office Action dated Oct. 2, 2012, Application No. 2011-502350, 4 pages.

(Continued)

*Primary Examiner* — Curtis Odom

(57) ABSTRACT

A method and apparatus for processing a signal in a wireless communication system. The method comprises: receiving a signal at a receiver over a wireless channel; sampling the signal to produce a plurality of signal samples; and supplying the samples to an equaliser implemented in software running on a processor of the receiver, the equaliser being configured to process the samples using at least one equaliser time period having a nominal length. The method further comprises dynamically determining one or more characteristics of the channel; in dependence on the determined channel characteristics, dynamically selecting between a first operational state of the equaliser in which the nominal length is used and a second operational state of the equaliser in which an alternative length is used in place of the nominal length; and processing the samples in the equaliser using the determined equaliser time period length.

22 Claims, 4 Drawing Sheets

(56) References Cited

U.S. PATENT DOCUMENTS

| | | |
|---|---|---|
| 2005/0036541 A1* | 2/2005 | McKown ............... 375/233 |
| 2007/0127588 A1* | 6/2007 | Kim ..................... 375/267 |
| 2008/0123728 A1* | 5/2008 | Xia et al. .............. 375/231 |

FOREIGN PATENT DOCUMENTS

| | | |
|---|---|---|
| EP | 0907259 A2 | 4/1999 |
| EP | 1289162 A2 | 3/2003 |
| JP | 08065205 A | 3/1996 |
| WO | 2004075497 A1 | 9/2004 |
| WO | 2007059518 A1 | 5/2007 |
| WO | 2009121795 A2 | 10/2009 |

OTHER PUBLICATIONS

Foreign Communication From a Related Counterpart Application, Chinese Application 200980111953.2, Chinese Office Action dated Jan. 11, 2013, 7 pages.

\* cited by examiner

EQUALISATION PROCESSING

CROSS REFERENCE TO RELATED APPLICATION

This application is the National Stage of, and therefore claims the benefit of International Application No. PCT/EP2009/053603 filed on Mar. 26, 2009, entitled "EQUALISATION PROCESSING," which was published in English under International Publication Number WO 2009/121795 on Oct. 8, 2009, and has priority based on GB 0806064.2 filed on Apr. 3, 2008. Each of the above applications is commonly assigned with this National Stage application and is incorporated herein by reference in their entirety.

FIELD OF THE INVENTION

The present invention relates to equalisation processing of a signal in a receiver of a wireless communication system.

BACKGROUND

In a Code-Division Multiple Access (CDMA) cellular communication system, one of the main impairments to system performance is the presence of multipath propagation. Multipath can cause deep fading of the signal envelope, and, intersymbol interference (ISI) in the case for which the multipath delay spread is significant compared with the transmission interval (for example, the chip interval in a CDMA communication system). Additionally, in the downlink, multipath propagation destroys the orthogonality between the desired signal to the mobile in question and the signals to other users on the base station serving this mobile. The resulting interference is referred to as Multiple Access Interference (MAI).

One approach to mitigating the effects of ISI and MAI is to use an equaliser at the mobile receiver. This can be used to some extent to "undo" the effects of multipath propagation on the transmitted signal, and hence go some way to restoring the orthogonality of same-cell signals prior to despreading.

In recent years there has been increasing interest in the use of "software modem" techniques in the field of cellular mobile telecommunications. The principle behind the software modem approach is to move a significant portion of the signal processing functionality from dedicated hardware, as it would have been implemented previously, into software running on a processor of the mobile terminal or other transmitter or receiver. One such function is the equalisation processing.

However, a price in terms of processing complexity must be paid for the use of a software equaliser, both in the calculation of the equaliser coefficients and in the actual equalisation of the received signal, e.g. filtering in the case of linear equalisation. It is therefore desirable to keep the equaliser design constrained to some extent, to avoid excess complexity and its attendant problems with processing capacity and power consumption.

It is an aim of the present invention to find an efficient way of constraining the processing cost of equalisation without unduly reducing performance.

SUMMARY OF THE INVENTION

According to one aspect of the present invention, there is provided a method of processing a signal in a wireless communication system, the method comprising: receiving a signal at a receiver over a wireless channel; sampling the signal to produce a plurality of signal samples; supplying the samples to an equaliser implemented in software running on a processor of the receiver, the equaliser being configured to process the samples using at least one equaliser time period having a nominal length; dynamically determining one or more characteristics of said channel; in dependence on the determined channel characteristics, dynamically selecting between a first operational state of the equaliser in which the nominal length is used and a second operational state of the equaliser in which an alternative length is used in place of said nominal length; and processing the samples in said equaliser using the determined equaliser time period length.

Thus the present invention is able to avoid unnecessary processing cost by dynamically deciding on a time period of the equaliser as appropriate to channel conditions. The adjustment is performed dynamically, i.e. "on the fly" during ongoing reception by the receiver, meaning it can adapt to channel conditions as required.

The problem of the processing complexity of the equaliser is addressed in UK patent application number GB 0721424.0 (corresponding to U.S. application Ser. No. 12/016,640), titled "radio receiver in a wireless communication system", in the name of Icera. Amongst other embodiments, that application relates to a length-varying algorithm for continuously varying equaliser parameters such as the equaliser length or the estimated channel length, based on an estimation of channel energy outside a predefined window. Although this reduces the processing cost of the equalisation, the length-varying algorithm is complex to implement and parameterise, and will itself incur some degree of processing burden.

However, in the present case, the inventors have found that there is not necessarily any need to always try to calculate a continuously variable relationship between the equaliser time period and channel characteristics, e.g. between channel estimate length or equaliser length and out-of-window energy measurement. Instead, an adequate performance of the equaliser can still be achieved by making a "yes or no" decision as to whether an alternative (e.g. shorter) length can be used or would be preferred at all. The equaliser uses the nominal length in the equalisation unless the criterion for using the alternative length is met. This is more efficient to implement and parameterise than the algorithm of GB 0721424.0, and may also allow for a reduction in the processing cost of the length-varying algorithm itself.

In preferred embodiments, one of said at least one equaliser time periods may be an estimated channel length, corresponding to a range of times beyond which a channel impulse response of said wireless channel is estimated to be negligible; and said processing by the equaliser may be performed using estimates of the channel impulse response only within said estimated channel length. And/or one of said at least one equaliser time periods may be an equalisation length, corresponding to a range of times for which equaliser coefficients are to be estimated; and said processing by the equaliser may be performed, using estimates of those coefficients, over the samples having times only within said equalisation length.

The method may comprise estimating a delay profile of said channel, the delay profile comprising an estimation of received signal energy over a delay period; and said determination of a characteristic may comprise determining the signal energy falling within a predetermined delay window within said delay interval.

The method may comprises estimating a delay profile of said channel, the delay profile comprising an estimation of received signal energy over a delay period; and said determination of a characteristic may comprise determining the ratio of the energy of a strongest component of said delay profile to the sum of the energy of the remaining components.

Said sampling may comprise sampling the signal at an integer over-sampling ratio of M times per binary element of the signal, so as to produce samples m=1 to M for each binary element, each value of m corresponding to a respective subchannel; the method may comprise determining a subchannel to use in the decision; and said determination of a characteristic and making of a decision may be performed using the samples of the selected subchannel.

Said sampling may comprise sampling the signal at an integer over-sampling ratio of M times per binary element of the signal, so as to produce samples m=1 to M for each binary element, each value of m corresponding to a respective subchannel; the method may comprises summing the energy of each subchannel to produce a plurality of summed samples; and said determination of a characteristic and making of a decision may be performed using the summed samples.

The received signal may be a CDMA signal, and each binary element of the signal is a chip.

The equalisation may involve a transform from the time domain to the frequency domain.

The alternative length may be shorter than the nominal length.

According to another aspect of the present invention, there is provided a receiver comprising: an antenna for receiving a signal over a wireless channel; sampling circuitry coupled to said antenna and arranged to take a plurality of samples of said signal, each sample corresponding to a respective time; and a processor coupled to said sampling circuitry and arranged to receive said samples, the processor being programmed to implement an equaliser for processing the samples using at least one equaliser time period having a nominal length; wherein the processor is further programmed to: dynamically estimate one or more characteristics of said channel; in dependence on the determined channel characteristics, dynamically select between a first operational state of the equaliser in which the nominal length is used and a second operational state of the equaliser in which an alternative length is used in place of said nominal length; and process the samples in said equaliser using the determined equaliser time period length.

According to another aspect of the present invention, there is provided a computer program product for processing a signal in a wireless communication system, the program comprising code which when executed by a processor performs the steps of: inputting a plurality of signal samples of a signal received over a wireless channel; supplying the samples to an equaliser implemented in the code, the equaliser being configured to process the samples using at least one equaliser time period having a nominal length; dynamically determining one or more characteristics of said channel; in dependence on the determined channel characteristics, dynamically selecting between a first operational state of the equaliser in which the nominal length is used and a second operational state of the equaliser in which an alternative length is used in place of said nominal length; and processing the samples in said equaliser using the determined equaliser time period length.

According to another aspect of the present invention, there is provided a mobile terminal comprising: an antenna for receiving a signal over a wireless channel; sampling circuitry coupled to said antenna and arranged to take a plurality of samples of said signal, each sample corresponding to a respective time; and a processor coupled to said sampling circuitry and arranged to receive said samples, the processor being programmed to implement an equaliser for processing the samples using at least one equaliser time period having a nominal length; wherein the processor is further programmed to: dynamically estimate one or more characteristics of said channel; in dependence on the determined channel characteristics, dynamically select between a first operational state of the equaliser in which the nominal length is used and a second operational state of the equaliser in which an alternative length is used in place of said nominal length; and process the samples in said equaliser using the determined equaliser time period length.

BRIEF DESCRIPTION OF THE DRAWINGS

For a better understanding of the present invention and to show how it may be carried into effect, reference will now be made by way of example to the accompanying drawings in which.

DETAILED DESCRIPTION OF PREFERRED EMBODIMENTS

Figure 1:
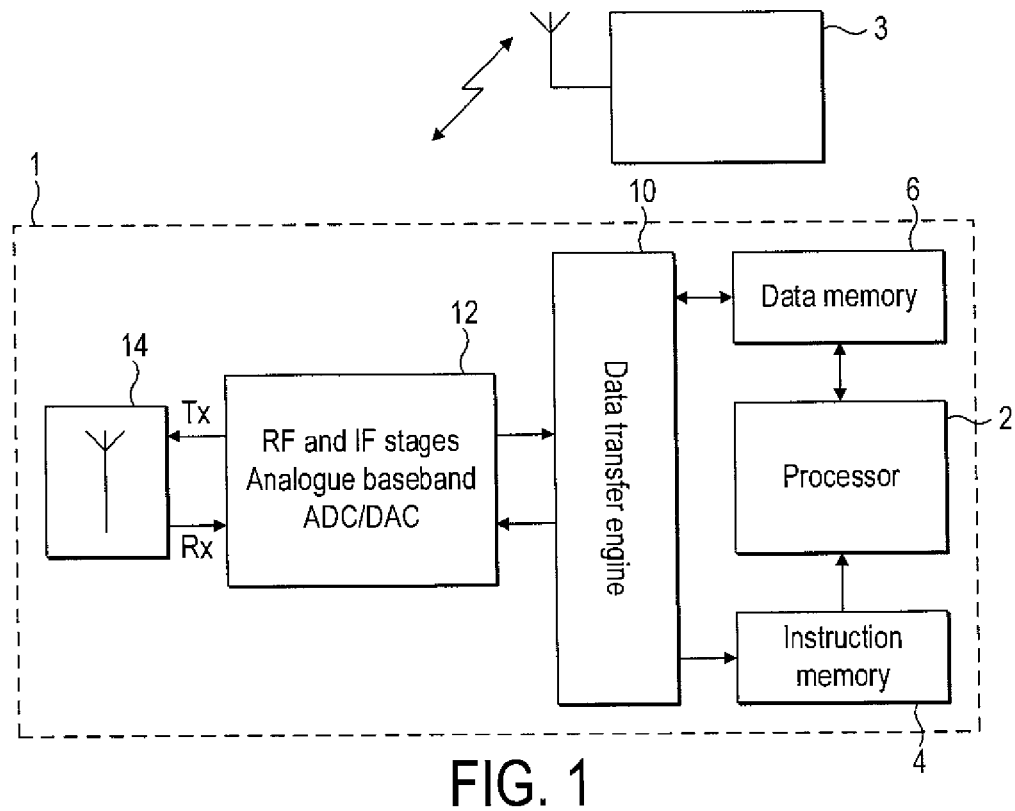
FIG. 1 is a schematic block diagram of a telecommunications system.

FIG. 1 is a schematic block diagram of part of a wireless cellular communications system, comprising a mobile terminal 1 and a base station 3.

The mobile terminal 1 comprises transceiver circuitry for transmitting signals to the base station 3 over a wireless channel (the uplink) and receiving signals from the base station 3 over a wireless channel (the downlink). Such circuitry can be realised in a number of different ways, but in the example of FIG. 1 it comprises one or more antennas 14, an RF interface (or "front-end") 12 comprising a series of radio frequency (RF) and intermediate frequency (IF) stages, a data transfer engine 10, a data memory 6, an instruction memory 4 and a processor 2. The one or more antennas 14 are coupled to the RF interface 12, which is coupled to the data transfer engine 10. The data transfer engine 10 is coupled to the data memory 6 and instruction memory 4, which are both coupled to the processor 2.

The front-end 12 is arranged to receive and transmit wireless signals (Rx and Tx) via the one or more antennas 14. The front-end 12 includes components for processing the received analogue radio signals Rx and providing digital signal samples. This can be achieved in different ways which are known in the art.

The samples are supplied to a data transfer engine 10 which communicates with a processor 2, an instruction memory 4 and a data memory 6. The processor 2 is responsible for processing the samples. The processor 2 can execute a number of different functions which are held in the instruction memory 4 in the form of code sequences.

The above transceiver of the mobile terminal 1 may be referred to as a software modem, or soft modem. Preferably, the software modem is a soft baseband modem. That is, on the receive side, all the radio functionality from receiving RF signals from the antenna 14 up to and including mixing down to baseband is implemented in dedicated hardware in the front-end 12. Similarly, on the transmit side, all the functionality from mixing up from baseband to outputting RF signals to the antenna 14 is implemented in dedicated hardware in the front-end 12. However, all functionality in the baseband domain is implemented in software stored on the memory 4 and executed by the processor 2. While this is a preferred implementation, solutions where the RF/IF stage is not implemented by dedicated hardware are also envisaged.

In the preferred implementation, the dedicated hardware in the receive part of the front-end 12 may comprise a low noise amplifier, (LNA), mixers for downconversion of the received RF signals to IF and for downconversion from IF to baseband, RF and IF filter stages, and an analogue to digital conversion (ADC) stage. An ADC is provided on each of in-phase and quadrature baseband branches for each of a plurality of receive diversity branches. The dedicated hardware in the transmit part of the front-end 12 may comprise a digital to analogue conversion (DAC) stage, mixers for upconversion of the baseband signals to IF and for upconversion from IF to RF, RF and IF filter stages, and a power amplifier (PA). Details of the required hardware for performing such basic radio functions will be known to a person skilled in the art.

The software running on the processor 2 may then handle functions such as: modulation and demodulation, interleaving and deinterleaving, rate matching and dematching, channel estimation, equalisation, rake processing, bit log-likelihood ratio (LLR) calculation, transmit diversity processing, receive diversity processing, multiple transmit and receive antenna processing (Multiple-Input Multiple-Output, or MIMO processing), voice codecs, link adaptation through power control or adaptive modulation and coding, and cell measurements. Particularly in the present invention, it handles the equalisation.

In a preferred embodiment, the data transfer engine 10, data memory 6, instruction memory 4, processor 2 and at least a portion of the front-end 12 are all implemented on the same chip. Preferably the chip used is made by Icera and sold under the trade name Livanto®. Such a chip has a specialised processor platform described for example in WO2006/117562.

Figure 2:
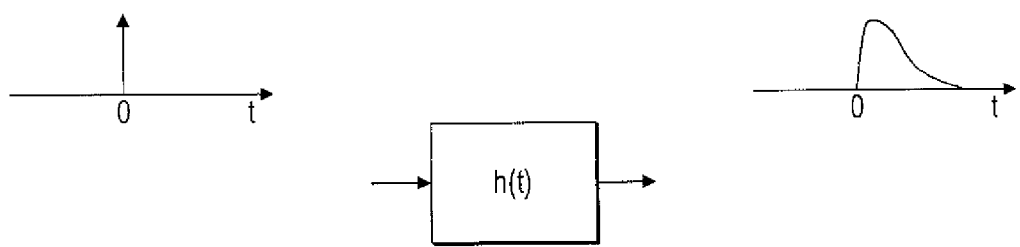
FIG. 2 is a schematic illustration of a channel impulse response.

As will be familiar to a person skilled in the art, if a theoretical instantaneous impulse was transmitted from the transmitter, then due to the effects of the channel the received signal r would be spread out over time. The received signal corresponding to this theoretical impulse is referred to as the impulse response h(t) of the channel. This is illustrated schematically in FIG. 2.

For a real, non-instantaneous signal x(t), the signal r(t) received at some time t will be the convolution of the transmitted signal with the channel impulse response.

$$r(t) = \int h(\tau) x(t-\tau) d\tau$$

It is the task of the equaliser to try to undo the effect of this "spreading out" of the signal over time.

Figure 3:
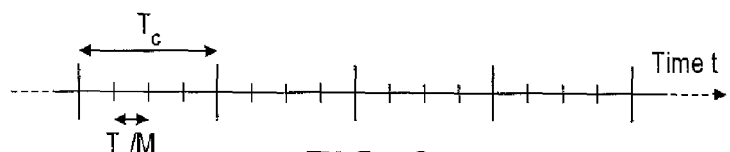
FIG. 3 is a schematic representation of a sequence of signal samples.

The above has been described theoretically by considering a continuous integral, but of course a digital receiver will work by taking discrete samples of the received signal. Consider the downlink transmission of a synchronous CDMA system. As illustrated schematically in FIG. 3, the received CDMA signal comprises a plurality of binary chips each of lasting for a period $T_c$ (the chip period). The signal may be over-sampled at an integer ratio M relative to the chip period, such that the receiver takes a sample once every $T_c/M$ (the sampling period), i.e. at a rate of $M/T_c$. Or if the signal is not over-sampled, M effectively equals one such that the receiver takes a sample once per chip.

Time can then be measured in terms of a chip index which is the integer number of chip periods offset from some reference time, i.e. such that for a chip index k then $t=kT_c$. Time can also be measured in terms of a sampling index which is the integer number of sampling periods offset from the reference time, i.e. such that for a chip index i then $t=iT_c/M$.

The above integral can then be approximated as a finite sum of discrete samples, giving the received discrete-time signal model:

$$r_i = \sum_n x_n h_{i-nM} + n_i \qquad (1)$$

where $r_i = r(iT_c/M)$ are the received signal samples taken at rate $M/T_c$ at sampling indices i, with $T_c$ denoting the chip interval and M the over-sampling ratio; $h_l = h(lT_c/M)$ is the $M/T_c$ rate sample of the complex equivalent channel impulse response at sampling index l, which is assumed stationary for the time interval of interest; $x_n$ represents the complex multiuser transmitted chip sequence, and $n_i = n(iT_c/M)$ is a complex additive Gaussian process, which models thermal noise and intercell interference.

In the model of equation (1), the channel impulse response includes the effect of the transmit and receive equivalent filters, which in the case of a Wideband-CDMA receiver are assumed root raised cosine filters with roll-off 0.22. It is also assumed that the channel impulse response samples $h_l$ are appreciably different from zero only for l=0, ..., LM−1 and that the channel is normalized so that its average energy is equal to 1. L is the modelled channel length measured in an integer number of chips.

The noise samples $n_i$ are assumed to derive from an additive white Gaussian intercell interference-plus-noise process $v_i = v(iT_c/M)$ with zero mean and variance $\sigma_n^2$, filtered by a low-pass filter with impulse response $g_l = g(lT_c/M)$ representing the equivalent receive filter, which in the case of a Wideband-CDMA receiver is a root raised cosine filter with roll-off 0.22.

The oversampled sequence $r_i$ can be decomposed into M chip rate subsequences relative to M distinct subchannels. In vector notation, we define for the k-th chip interval:

$$r_k^{(m)} = [r_{kM+m} r_{(k+1)M+m} \ldots r_{(k+N-1)M+m}]^T, m=0, \ldots, M-1 \qquad (2)$$

where $(\bullet)^T$ indicates vector transpose and m is an integer. From equations (1) and (2), it can also be written:

$$r_k^{(m)} = H^{(m)} x_k + n_k^{(m)}, m=0, \ldots, M-1 \qquad (3)$$

with:

$$x_k = [x_{k-L+1} \ldots x_k \ldots x_{k+N-1}]^T,$$

and:

$$H^{(m)} = \begin{bmatrix} h_{L-1}^{(m)} & h_{L-2}^{(m)} & \ldots & h_0^{(m)} & 0 & \ldots & 0 \\ 0 & h_{L-1}^{(m)} & \ldots & h_1^{(m)} & h_0^{(m)} & \ldots & 0 \\ \vdots & \vdots & \ddots & \vdots & \vdots & \ddots & \vdots \\ 0 & 0 & \ldots & 0 & 0 & \ldots & h_0^{(m)} \end{bmatrix}^T \qquad (4)$$

where:

$$h_l^{(m)} = h_{lM+m}$$

and:

$$n_k^{(m)} = [n_{kM+m} n_{(k+1)M+m} \ldots n_{(k+N-1)M+m}]^T.$$

The equaliser attempts to recover the transmitted signal x from the received symbols r which have been corrupted by noise and multipath according to equation (3). It does this by filtering r with a a set of coefficients producing an output denoted by the symbols $y_k$. Denoting the N-dimensional vector of equaliser coefficients relative to the $m^{th}$ subchannel by:

$$w_k^{(m)} = [w_{kM+m} w_{(k+1)M+m} \ldots w_{(k+N-1)M+m}]^T$$

Then the equaliser output at chip index k can be written as:

$$y_k = y(kT_c) = \sum_{l=0}^{MN-1} w_l r_{k-l} = w_k^{(0)T} r_k^{(0)} + \ldots + w_k^{(M-1)T} r_k^{(M-1)} \quad (5)$$

N is the equaliser length, i.e. the integer number of chips over which the equalisation is performed. Note that in an oversampled system with oversampling factor M, an equaliser time span of N chips corresponds to MN samples.

So defining the MN×1 vectors as:

$$w_k = [w_k^{(0)T} \ldots w_k^{(M-1)T}]^T,$$

$$r_k = [r_k^{(0)T} \ldots r_k^{(M-1)T}]^T, \text{ and}$$

$$n_k = [n_k^{(0)T} \ldots n_k^{(M-1)T}]^T,$$

and introducing the MN×(N+L−1) channel matrix:

$$H = [H^{(0)T} \ldots H^{(M-1)T}]^T.$$

then with this notation, it can be written:

$$r_k = H x_k + n_k \quad (6)$$

and the output of the chip-level channel equaliser results:

$$y_k = w_k^T r_k \quad (7)$$

This signal is a composite chip rate sequence, which is then further processed to separately descramble and despread the data associated to the different downlink codes.

The above equaliser model corresponds to a Baud-spaced linear equaliser for M=1, and to a fractionally-spaced linear equaliser with $T_c/M$ spaced coefficients for M>1. Note that the model also formalizes the operation of a receive diversity equaliser, in the case where all or some of the M chip-rate subchannels correspond to the signal samples obtained from multiple receive antennas.

From equation (7), once the equaliser has computed the weighting coefficients then it can obtain the output y. A common strategy for the computation of the MN equaliser coefficients of the vector $w_k$ is based on the minimization of the Mean-Square Error (MSE) at the equaliser output.

In principle, this can be achieved by block processing or by means of an adaptive algorithm. Such adaptive algorithms are discussed in: M. Heikkila, P. Komulainen and J. Lilleberg, "Interference Suppression in CDMA Downlink through Adaptive Channel Equalization", in *Proc. IEEE Vehicular Technology Conference*, vol. 2, Amsterdam, The Netherlands, September 1999, pp. 978-982; and K. Hooli, M. Latva-aho and M. Juntti, "Performance Evaluation of Adaptive Chip-Level Channel Equalizers in WCDMA Downlink", in *Proc. IEEE International Conference on Communications*, vol. 6, Helsinki, Finland, June 2001, pp. 1974-1979.

In the case of a synchronous CDMA receiver, the application of adaptive processing based for example on a Normalized Least Mean-Square (NLMS) updating rule of the equaliser coefficients suffers from the non-orthogonality of the downlink codes in the presence of multipath. This results in a relatively large error signal, which requires a small adaptation step size to provide sufficient averaging, and hence slows down convergence.

In the case of a block linear equaliser, the optimum vector $w_{k(opt)}$ according to the Minimum Mean-Square Error (MMSE) criterion is obtained as:

$$w_{k(opt)} = \arg\min_{w_k} E\{|w_k^T r_k - x_{k+D}|^2\} \quad (8)$$

where $E\{\cdot\}$ denotes statistical expectation and D is the overall delay at the equaliser output. From equation (8) straightforward calculation gives:

$$w_{k(opt)} = E\{r_k^* r_k^T\}^{-1} E\{r_k^* x_{k+D}\} = \left(H^* H^T + \frac{1}{\sigma_x^2} C_{nn}\right)^{-1} h_{k+D}^* \quad (9)$$

where $(\cdot)^*$ denotes complex conjugation, $\sigma_x^2 = E\{|x_k|^2\}$ is the variance of the transmitted composite chip sequence, $C_{nn} = E\{n_k^* n_k^T\}$ is the noise-plus-interference covariance matrix, and $h_{k+D}$ indicates the MN×1 column of the channel matrix H corresponding to the multiuser chip $x_{k+D}$.

The calculation of the optimum MMSE equaliser coefficients requires the availability of an estimate of the channel matrix H and of the noise covariance matrix $C_{nn}$. In a WCDMA receiver, channel estimation can be performed based on the downlink common pilot symbols (see later). For the calculation of the noise covariance matrix, denoting by G the receive filter matrix we have:

$$C_{nn} = \sigma_n^2 G^* G^T \quad (10)$$

Since the receive filter is part of the receiver design, it is possible to pre-compute and store the matrix $G^* G^T$ to be used in (equation 10). Note that, if the receive filter frequency response is the exact square root of a Nyquist filter response, then $G^* G^T = I$ (the unit matrix) and from equation (10) it follows that $C_{nn} = \sigma_n^2 I$.

Based on equation (9), equation (10) can be rewritten as:

$$w_{k(opt)} = \left(H^* H^T + \frac{\sigma_n^2}{\sigma_x^2} G^* G^T\right)^{-1} h_{k+D}^* \quad (11)$$

After estimation of the channel response, the only additional parameter to be estimated in equation (11) is the ratio between the input intercell interference-plus-noise variance $\sigma_n^2$ and the composite chip sequence variance $\sigma_x^2$, which corresponds to the inverse of the cell geometry.

In order to avoid the calculation of the matrix inverse required by equation (11), the computation of the equaliser coefficients may be alternatively performed in the frequency domain. Denote by $W_j$, $H_j$ and $N_j$, where j=0, ..., $N_f$−1 the Discrete Fourier Transform (DFT) of the equaliser coefficients $w_l$, the sampled equivalent channel impulse response $h_l$ and the noise autocorrelation function, respectively.

Then, for an MMSE frequency domain equaliser, one obtains the frequency domain equaliser coefficients:

$$W_j = \frac{H_j^*}{|H_j|^2 + \frac{1}{\sigma_x^2} N_j}. \quad (12)$$

In this case, equalisation of a block of data is performed by computing the DFT of the received signal samples (equation 1), multiplying the frequency domain signal by the frequency domain equaliser coefficients $W_k$, and finally computing the inverse DFT of the resulting frequency domain equalised signal. The operations of DFT and inverse DFT can be efficiently implemented by means of $N_f$-point Fast Fourier Transform (FFT) and Inverse Fast Fourier Transform (IFFT). When combined with FFT processing and the use of a cyclic prefix, a single-carrier system with frequency domain equalisation has essentially the same performance and low complexity of an Orthogonal Frequency-Division Multiplexing (OFDM) system.

If the interference-plus-noise samples at the input of the receive filter are modelled as a white Gaussian process with zero mean and variance $\sigma_n^2$, then denoting by $G_j$ where $j=0, \ldots, N_f-1$ the DFT of the sampled receive filter impulse response $g_i$, one has:

$$N_j = \sigma_n^2 |G_j|^2 \quad (13)$$

and equation (12) becomes:

$$W_j = \frac{H_j^*}{|H_j|^2 + \frac{\sigma_n^2}{\sigma_x^2}|G_j|^2} \quad (14)$$

where $|G_j|^2=1$ for $j=0, \ldots, N_f-1$ if the receive filter impulse response is the exact square-root of a Nyquist filter response.

Now, as mentioned above, it would be desirable to reduce the processing cost of the equalisation. The complexity, processing requirements and power consumption of the equalisation processes are determined by three main components of the above process, namely:

Estimation of channel coefficients $h_0^{(m)}, h_1^{(m)}, \ldots, h_{L-1}^{(m)}$ in the notation of equation (4);

Computation of the equaliser tap vectors $w_k^{(m)}$; and

Filtering of the received data using the equaliser tap vectors.

In the situations where there is a dominant multipath component, the multipath propagation profile approximately corresponds to a single ray, and the other components are of negligible power compared with this component. In this case, the channel frequency response is practically non-frequency selective, or "flat". A multipath propagation profile which fits these criteria is referred to herein as a "nearly flat fading" profile.

For a nearly flat fading profile, it is unnecessary and wasteful of processing resources to continue to estimate channel coefficients which are "far" (in delay terms), from the dominant component. Also, the estimation of channel coefficients inevitably introduces some errors due to finite precision effects, and the contribution of this imprecision is reduced when the shorter channel estimate is used. See for reference C. Luschi, M. Sandell, P. Strauch, and R. H. Yan, "Adaptive Channel Memory Truncation for TDMA Digital Mobile Radio", in *Proc. IEEE Int. Workshop on Intelligent Signal Processing and Communication Systems*, Melbourne, Australia, November 1998, pp. 665-669.

Moreover, if a smaller set of channel coefficients is employed, the computation of the equaliser tap vector is generally simplified.

For a nearly flat fading profile, it may also be possible to reduce the equaliser filter length, thus achieving further complexity savings. However, the relationship between the required equaliser length and the multipath profile is complicated. In order to make a decision on whether it is possible to reduce the equaliser length with relatively low performance degradation, it may be necessary to introduce further information. This may be provided for example by the orthogonality factor β discussed below.

Thus, in addition to using the channel information to compute the MMSE coefficients, the preferred embodiments of the present invention advantageously reduce the processing cost of the equalisation by also using the channel information to make a decision on:

a) the length of the estimated channel supplied to the equaliser coefficient computation; and/or:

b) the length of the equaliser filter to be used.

In the case (a) of reducing the channel estimate length, this means reducing the range of times beyond which it is assumed that the channel impulse response is negligible. Referring to the exemplary working shown, that corresponds to reducing L in the above equations, e.g. see equations (3) and (4).

In the case (b) of reducing the equaliser length, this means reducing the number equaliser coefficients used in the equalisation and therefore the number of samples over which the equalisation is performed. Referring to the exemplary working shown, that corresponds to reducing N in the above equations, e.g. see equation (5).

Figure 4:
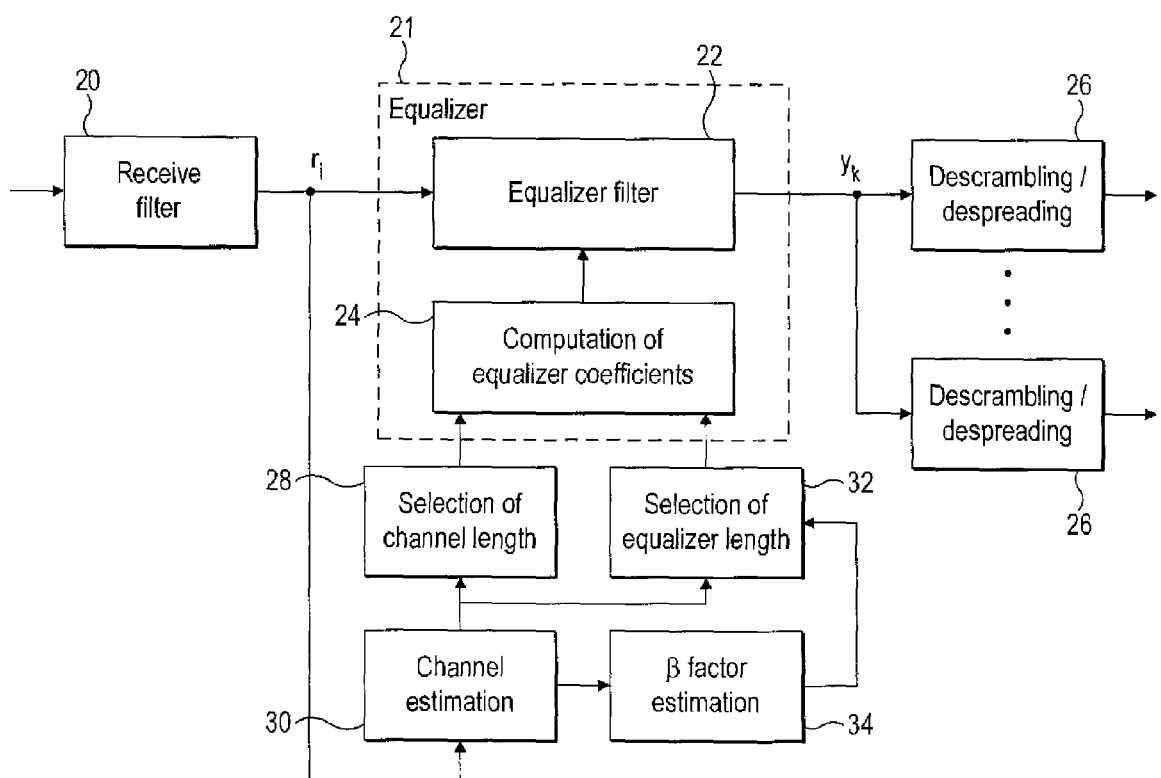
FIG. 4 is a schematic block diagram of a part of a receiver.

FIG. 4 is a functional block diagram of a part of the receiver 1 including the chip-level equaliser processing, illustrating schematically the information flow in such a scheme. This part of the receiver comprises a receive filter 20, an equaliser 21, a plurality of descrambling and despreading blocks 26, a channel length selection block 28, a channel estimation block 30, an equaliser length selection block 32 and a β factor estimation block 34. The equaliser 21 comprises an equaliser filter 22 and a coefficient computation block 24. Preferably at least the equaliser 21, channel length selection block 28, channel estimation block 30, equaliser length selection block 32 and β factor estimation block 34 are functional blocks implemented in software arranged to run on the processor 2.

The output of receive filter 20 is coupled to an input of the equaliser filter 22 and an input of the channel estimation block 30. An output of the channel estimation block 30 is coupled to an input of the β factor estimation block 34, an input of the channel length selection block 28 and an input of the equaliser length selection block 32. The output of the factor estimation block 34 is also coupled to the equaliser length selection block 32. The output of the channel length selection block 30 and an output of the equaliser length selection block 32 are each coupled to an input of the coefficient computation block 24, an output of which is coupled to an input of the equaliser filter 22. The output of the equaliser filter 22 is coupled to the inputs of the respective descrambling and despreading blocks 26.

In operation, the equaliser filter 22 receives signal samples $r_i$ from the receive filter 20, receives equaliser coefficients W from the coefficient calculation block 24, uses the equaliser coefficients to process the received signal samples $r_i$ to recover chip values $y_k$, and outputs the recovered chip values $y_k$ to the descrambling/despreading blocks 26.

The channel estimation block 30 also receives the signal samples $r_i$ from the receive filter 20 and outputs channel estimation information to the β factor estimation block 34, the channel length selection block 30 and the equaliser length selection block 32. The factor estimation block 34 uses the channel estimation information to estimate an orthogonality factor β, which it provides to the equaliser length selection block 32.

Based on the channel estimation information, the channel length selection block 28 selects a channel estimate length L for use in the equalisation and provides an indication of the selected channel length to the coefficient computation block 24. Based on the channel estimation information and the orthogonality factor β, the equaliser length estimation block selects an equaliser length N for use in the equalisation and provides an indication of the selected equaliser length to the coefficient computation block 24. The coefficient calculation block then uses the selected channel length and equalisation length to compute the equaliser coefficients W for use by the equalisation filter, for example in the manner described above. The decision as to channel estimate length L is between only two options, a shorter channel length and the "full" channel length. Similarly, the decision as to equaliser length N is between only two options, a shorter equaliser length and a "nominal" equaliser length.

An example of shortening of the estimated channel length based on channel estimation information is now discussed.

The decision on whether or not the multipath profile approximates a single ray can be made by examining the power delay profile of the estimated multipath channel. An example of this is shown schematically in FIG. 5.

Figure 5:
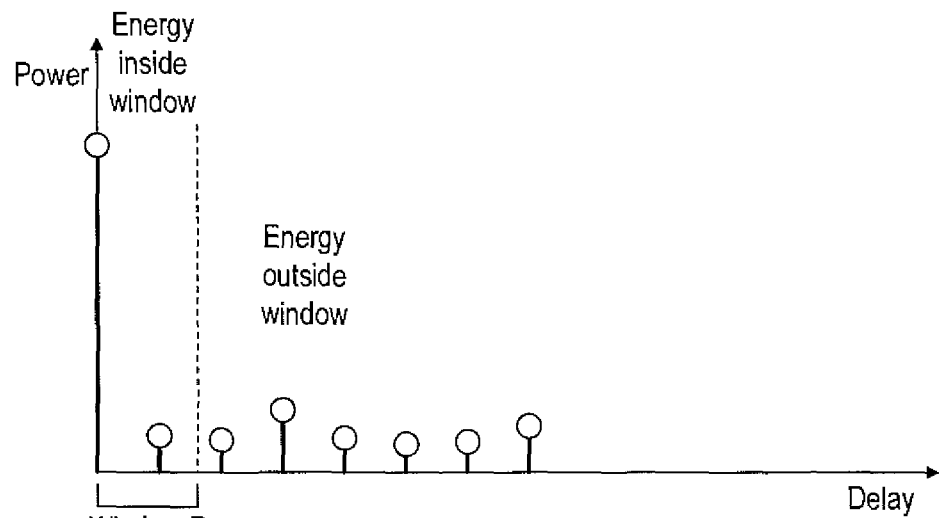
FIG. 5 is a schematic illustration of a multipath power delay profile.

Referring to FIG. 5, a short window on the delay axis can be defined, such that multipath energy falling inside the window is deemed to be sufficiently close (in delay terms) to energy that would be received in the single path case. Adopting the notation used above, the channel impulse response is denoted $h_l^{(m)} = h_{lM+M}$, with $l=0, \ldots, L-1$ and $m=0, \ldots, M-1$. As a first example, attention is restricted to the single subchannel case, $M=1$, i.e. no fractionally spaced or receive diversity operation.

Defining a temporal window comprising the first P chip delays of the estimated channel impulse response (e.g. $P=2$ in FIG. 5), the channel energies inside the window ($E_{in}$) and outside the window ($E_{out}$) are given by:

$$E_{in} = \sum_{l=0}^{P-1} |h_l^{(0)}|^2; \quad (15)$$

$$E_{out} = \sum_{l=P}^{L-1} |h_l^{(0)}|^2$$

If most of the energy in the given multipath profile falls inside the window, then it can be postulated that the channel delay spread is sufficiently small, and that a shortened channel estimate can be used in this case.

There are many possibilities for the decision criterion, but one example is for some suitable energy ratio threshold:

If ($E_{out}/E_{in}$<threshold)

Use short channel estimate

Else

Use full channel estimate (16)

In practice, the power delay profile shown in FIG. 5 would be the output of the channel estimation process. Since this profile can change as a function of time, the decision (16) on whether or not to use the shortened channel estimate needs to be revisited repeatedly. That is, the decision making process and any necessary corresponding adjustment to the estimated channel length is performed dynamically. As an example, the full channel estimation may be carried out with periodicity a fixed number of frames, and in the intervening time, either the full or shortened channel estimation may be carried out, depending upon the result of the decision process (16). This is illustrated schematically in FIG. 6, in which the channel estimation length check is carried out every two frames.

An example of shortening of the equalisation filter based on channel estimation information is now discussed. This example is again restricted to the case of single-channel chip-spaced equalisation ($M=1$).

Figure 7:
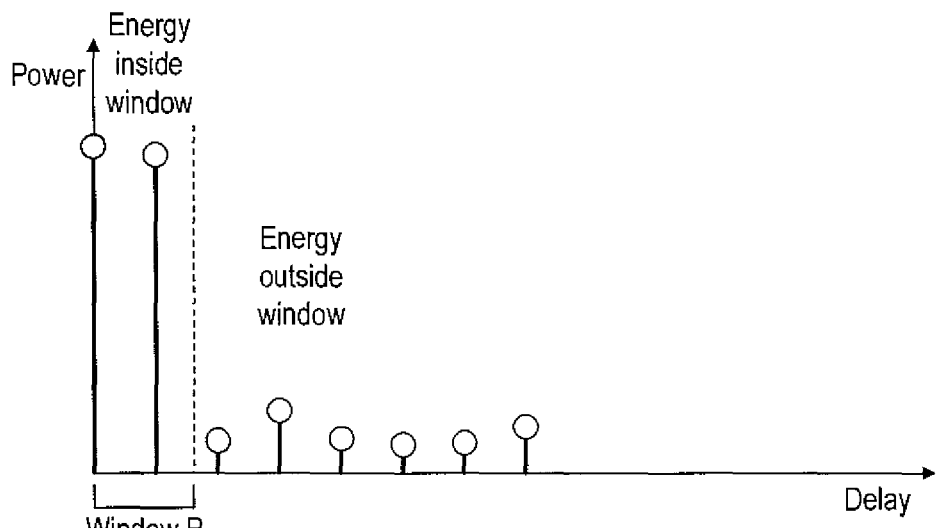
FIG. 7 is a schematic illustration of a multipath power delay profile.

As mentioned, preferably in addition to shortening the equalisation channel length, it is possible to go further with the process and actually shorten the equaliser filter itself (or potentially shorten the equaliser filter without varying the channel length). However, there are potential difficulties with basing the decision on whether to shorten the equaliser filter upon the same windowing process used to make the decision on shortening of the channel estimate. For example, if $P=2$, and there is a profile in which the first two rays are of similar, high power as illustrated schematically in FIG. 7, then the decision to use a shortened channel estimate is clear, but using a shortened equaliser may cause a significant performance degradation, because the two nearly equal power rays may represent a channel which requires a long equaliser.

Figure 8:
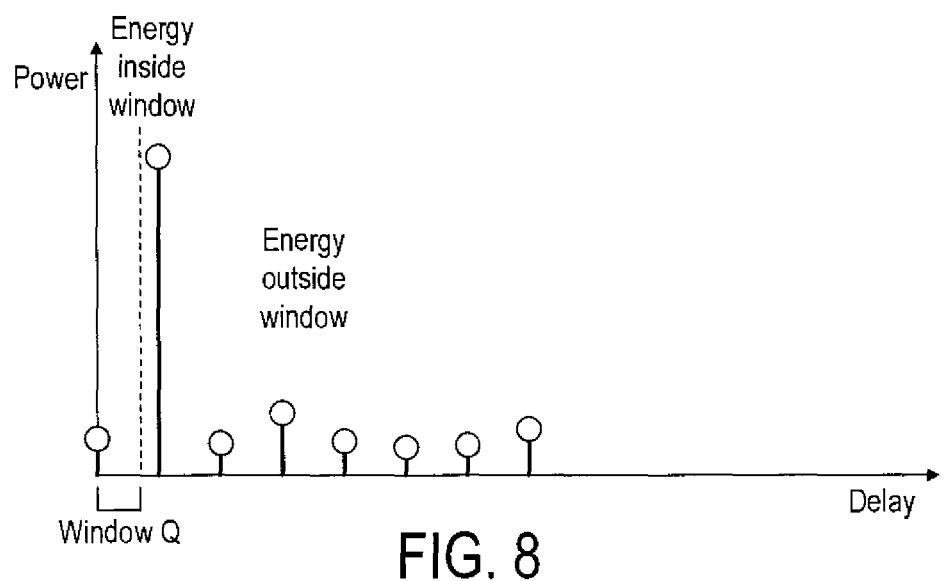
FIG. 8 is a schematic illustration of a multipath power delay profile.

To circumvent this problem, the decision on shortening of the equaliser could be always made with a window of different window of size $Q=1$, so only the contribution of the first ray was counted as "in window" power. However, this has the drawback that a multipath profile which has a strong, dominant ray which is not the earliest ray would fail the test. This is illustrated schematically in FIG. 8.

In order to accommodate such channels, the shortened equaliser decision can be made based on a window centred around the strongest channel tap. Alternatively or additionally, a decision could be considered based not only on the channel energy inside and outside the window, but also on the ratio of the energy in the strongest ray to the sum of the energy of the remaining channel components. If i denotes the index of the strongest ray, then this ratio is given by the orthogonality factor $β_i$:

$$\beta_i = \frac{\sum_{l=0}^{L_0-1} |h_l|^2 - |h_i|^2}{\sum_{l=0}^{L_0-1} |h_l|^2} \quad (17)$$

The decision process then becomes, for some suitable β threshold value:

If ($β_i$<threshold)

Use short equaliser

Else

Use nominal equaliser (18)

Figure 6:
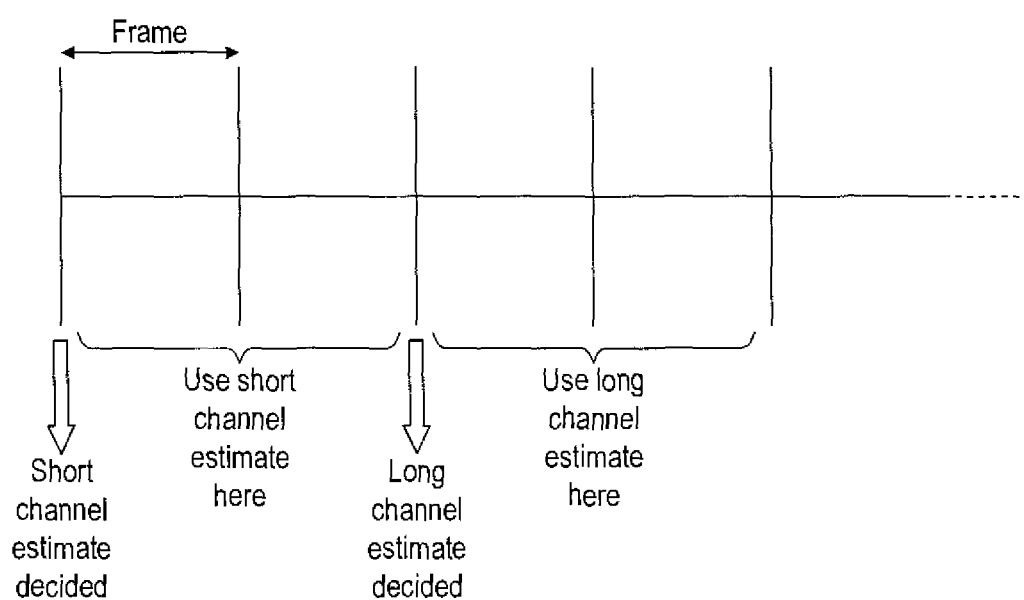
FIG. 6 is a schematic illustration of a dynamic decision process.

The decision and corresponding adjustment of the equaliser filter length is also performed dynamically, for example as described in relation to FIG. 6.

The above examples have been considered for the case where $M=1$. The case in which a fractionally spaced or diversity equalisation is used (i.e. $M>1$) is now considered. In this case, a small modification to the criterion for the decision of using a shortened channel estimate is desirable. For the purposes of explanation, the example is restricted to M=2 and fractionally spaced operation will be referred to, but it will be appreciated that the principle can be extended. It is also assumed that there are thus two chip-spaced "subchannels" to consider in the equalisation process, corresponding to two half-chip spaced samples per chip. It is conceivable that at some instant, a given subchannel, say channel 0, has the strongest channel impulse response, and has a nearly flat fading profile. Subchannel 1 may have components with a high delay spread, but relatively low amplitudes. In this case, it could be desirable to choose the shortened channel estimate. In order to facilitate this, the decision process can first make a decision upon the subchannel to use, and then apply the window criterion to that subchannel.

Adopting the notation:

$$E_{in}^{(m)} = \sum_{l=0}^{W-1} |h_l^{(m)}|^2 \text{ (Energy on subchannel } m \text{ inside window)} \quad (19)$$

$$E_{out}^{(m)} = \sum_{l=W}^{L-1} |h_l^{(m)}|^2 \text{ (Energy on subchannel } m \text{ outside window)}$$

Then the decision process is:

if $(E_{in}^{(0)} + E_{out}^{(0)} > E_{in}^{(1)} + E_{out}^{(1)})$

Select channel 0 else

Select channel 1 \quad (20)

And for the selected channel (denoted by the index m):

if $(E_{out}^{(m)}/E_{in}^{(m)} < \text{threshold})$

Use short equaliser else

Use nominal equaliser \quad (21)

An alternative strategy is to add the energies in the subchannels, and use an identical procedure to that described above for the M=1 case. Defining the first P chip delays to comprise the window, the energies inside the window ($E_{in}$) and outside the window ($E_{out}$) are given by:

$$E_{in} = \sum_{m=0}^{M-1} \sum_{l=0}^{P-1} |h_l^{(m)}|^2, \quad (22)$$

$$E_{out} = \sum_{m=0}^{M-1} \sum_{l=P}^{L-1} |h_l^{(m)}|^2$$

And the decision is:

if $(E_{out}/E_{in} < \text{threshold})$

Use short channel estimate else

Use full channel estimate \quad (23)

As in the M=1 case, the decision and corresponding adjustment of the estimated channel length and/or equaliser filter length for the case where M>1 is performed dynamically, for example as described in relation to FIG. 6.

It will be appreciated that the above embodiments are described only by way of example. In other embodiments for instance, although the above has been described in terms of selecting the length based on signal energy inside and outside a window, other channel conditions and/or criteria suitable for making a decision as to channel length may be apparent to a person skilled in the art. For example, a high error rate or low signal-to-interference ratio could be indicative of high intersymbol interference (ISI) or multiple-access interference (MAI) and therefore be used as a basis for overriding the decision to use a short equaliser filter length and/or channel estimate length and instead selecting larger values for these parameters. Further, for example, above a certain threshold a fixed full length channel length could used, but below the threshold a variable channel length could "kick in". If there is a highly dispersive channel (energy ratio in equation 16 is above a certain threshold), a decision could be taken to either (i) wait a longer time before revisiting the channel estimate length decision or (ii) continue with the full length channel estimation and only revert to the periodic decisions when the energy ratio drops below another, lower, threshold. Other embodiments can be considered, for example, if information on how fast the multipath profile changes is made available to the decision making process (block 28 of FIG. 4), then the process can select the time period between decisions (depicted for example as 2 frames in FIG. 6) based upon this information. Further, the invention is not limited to the particular Livanto® platform described above, nor is it limited to CDMA systems or any particular standard or network. Other applications and configurations will be apparent to the person skilled in the art. The scope of the invention is not limited by the described embodiments, but only by the following claims.

The invention claimed is:

1. A method of processing a signal in a wireless communication system, the method comprising:
   receiving a signal at a receiver over a wireless channel;
   sampling the signal to produce a plurality of signal samples;
   supplying the samples to an equalizer implemented in software running on a processor of the receiver, the equalizer being configured to process the samples using at least one equalizer time period having a nominal length;
   dynamically determining one or more characteristics of said channel;
   in dependence on the determined channel characteristics, dynamically selecting between a first operational state of the equalizer in which the nominal length is used and a second operational state of the equalizer in which an alternative length is used in place of said nominal length, whereby the equalizer time period length is selected between only two options, being the nominal length and the alternative length; and
   processing the samples in said equalizer using the determined equalizer time period length.

2. The method of claim 1, wherein:
   one of said at least one equalizer time periods is an estimated channel length, corresponding to a range of times beyond which a channel impulse response of said wireless channel is estimated to be negligible; and said processing by the equalizer is performed using estimates of the channel impulse response only within said estimated channel length.

3. The method of claim 1, wherein:
one of said at least one equalizer time periods is an equalization length, corresponding to a range of times for which equalizer coefficients are to be estimated; and
said processing by the equalizer is performed, using estimates of those coefficients, over the samples having times only within said equalization length.

4. The method of claim 1, wherein:
the method comprises estimating a delay profile of said channel, the delay profile comprising an estimation of received signal energy over a delay period; and
said determination of a characteristic comprises determining the signal energy falling within a predetermined delay window within said delay interval.

5. The method of claim 1, wherein:
the method comprises estimating a delay profile of said channel, the delay profile comprising an estimation of received signal energy over a delay period; and
said determination of a characteristic comprises determining the ratio of the energy of a strongest component of said delay profile to the sum of the energy of the remaining components.

6. The method of claim 1, wherein:
said sampling comprises sampling the signal at an integer over-sampling ratio of M times per binary element of the signal, so as to produce samples m=1 to M for each binary element, each value of m corresponding to a respective subchannel;
the method comprises determining a subchannel to use in the decision; and
said determination of a characteristic and making of a decision are performed using the samples of the selected subchannel.

7. The method of claim 1, wherein:
said sampling comprises sampling the signal at an integer over-sampling ratio of M times per binary element of the signal, so as to produce samples m=1 to M for each binary element, each value of in corresponding to a respective subchannel;
the method comprises summing the energy of each subchannel to produce a plurality of summed samples; and
said determination of a characteristic and making of a decision are performed using the summed samples.

8. The method of claim 6, wherein the received signal is a CDMA signal, and each binary element of the signal is a chip.

9. The method of claim 1, wherein the equalization involves a transform from the time domain to the frequency domain.

10. The method of claim 1, wherein the alternative length is shorter than the nominal length.

11. A receiver, comprising:
an antenna for receiving a signal over a wireless channel;
sampling circuitry coupled to said antenna and arranged to take a plurality of samples of said signal, each sample corresponding to a respective time; and
a processor coupled to said sampling circuitry and arranged to receive said samples, the process or being programmed to implement an equalizer for processing the samples using at least one equalizer time period having a nominal length;
wherein the processor is further programmed to:
dynamically estimate one or more characteristics of said channel;
in dependence on the determined channel characteristics, dynamically select between a first operational state of the equalizer in which the nominal length is used and a second operational state of the equalizer in which an alternative length is used in place of said nominal length, whereby the equalizer time period length is selected between only two options, being the nominal length and the alternative length; and
process the samples in said equalizer using the determined equalizer time period length.

12. The receiver of claim 11, wherein the processor is programmed such that:
one of said at least one equalizer time periods is an estimated channel length, corresponding to a range of times beyond which a channel impulse response of said wireless channel is estimated to be negligible; and
said processing by the equalizer is performed using estimates of the channel impulse response only within said estimated channel length.

13. The receiver of claim 11, wherein the process or is programmed such that:
one of said at least one equalizer time periods is an equalization length, corresponding to a range of times for which equalizer coefficients are to be estimated; and
said processing by the equalizer is performed, using estimates of those coefficients, over the samples having times only within said equalization length.

14. The receiver of claim 11, wherein the processor is programmed:
to estimate a delay profile of said channel, the delay profile comprising an estimation of received signal energy over a delay period; and
such that said determination of a characteristic comprises determining the signal energy falling within a predetermined delay window within said delay interval.

15. The receiver of claim 11, wherein the processor is programmed:
to estimate a delay profile of said channel, the delay profile comprising an estimation of received signal energy over a delay period; and
such that said determination of a characteristic comprises determining the ratio of the energy of a strongest component of said delay profile to the sum of the energy of the remaining components.

16. The receiver of claim 11, wherein:
the sampling circuitry is configured to sample the signal at an integer over-sampling ratio of M times per binary element of the signal, so as to produce samples m=1 to M for each binary element, each value of m corresponding to a respective subchannel;
the processor is programmed to determine a subchannel to use in the decision; and
the processor is programmed such that said determination of a characteristic and making of a decision are performed using the samples of the selected subchannel.

17. The receiver of claim 11, wherein:
the sampling circuitry is configured to sample the signal at an integer over-sampling ratio of M times per binary element of the signal, so as to produce samples m=1 to M for each binary element, each value of m corresponding to a respective subchannel;
the processor is programmed to sum the energy of each subchannel to produce a plurality of summed samples; and
the processor is programmed such that said determination of a characteristic and making of a decision are performed using the summed samples.

18. The receiver of claim 16, wherein the receiver is a CDMA receiver configured for receiving a CDMA signal, and each binary element of the signal is a chip.

19. The receiver of claim 11, wherein the processor is programmed such that said equalization involves a transform from the time domain to the frequency domain.

20. The receiver of claim 11, wherein the alternative length is shorter than the nominal length.

21. A computer program product for processing a signal in a wireless communication system, the program comprising code embodied on a non-transitory computer readable medium which when executed by a processor performs the steps of:

inputting a plurality of signal samples of a signal received over a wireless channel;

supplying the samples to an equalizer implemented in the code, the equalizer being configured to process the samples using at least one equalizer time period having a nominal length;

dynamically determining one or more characteristics of said channel;

in dependence on the determined channel characteristics, dynamically selecting between a first operational state of the equalizer in which the nominal length is used and a second operational state of the equalizer in which an alternative length is used in place of said nominal length, whereby the equalizer time period length is selected between only two options, being the nominal length and the alternative length; and processing the samples in said equalizer using the determined equalizer time period length.

22. A mobile terminal, comprising:

an antenna for receiving a signal over a wireless channel;

sampling circuitry coupled to said antenna and arranged to take a plurality of samples of said signal, each sample corresponding to a respective time; and a processor coupled to said sampling circuitry and arranged to receive said samples, the process or being programmed to implement an equalizer for processing the samples using at least one equalizer time period having a nominal length;

wherein the processor is further programmed to: dynamically estimate one or more characteristics of said channel; independence on the determined channel characteristics, dynamically select between a first operational state of the equalizer in which the nominal length is used and a second operational state of the equalizer in which an alternative length is used in place of said nominal length, whereby the equalizer time period length is selected between only two options, being the nominal length and the alternative length; and process the samples in said equalizer using the determined equalizer time period length.

* * * * *